Oct. 29, 1957   H. F. CLAUSEN   2,811,368
VERTICALLY AND LATERALLY ADJUSTABLE WHEEL
MOUNTING MEANS FOR POTATO DIGGERS
Filed Nov. 10, 1955                    2 Sheets-Sheet 1
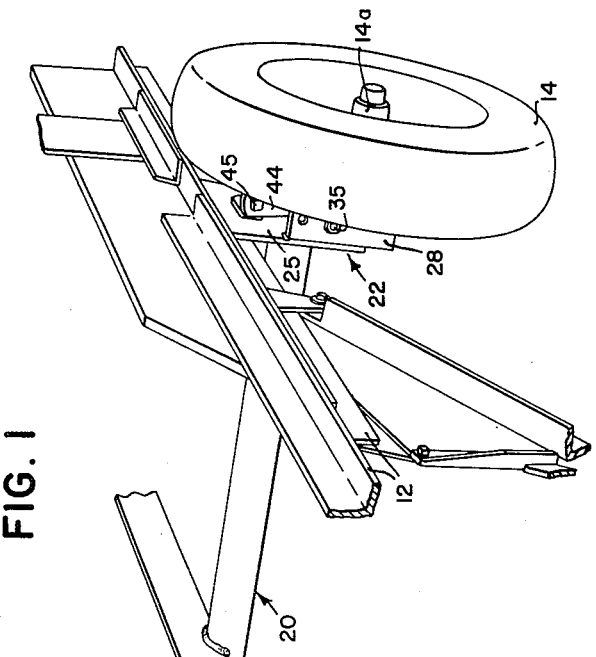
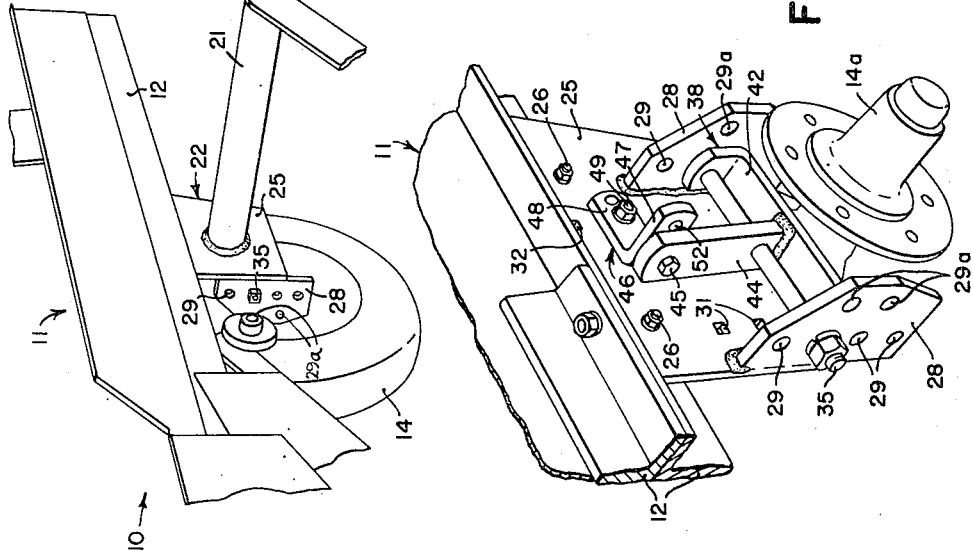
*INVENTOR.*
HOWARD F. CLAUSEN
BY
C. T. Parker  R. C. Johnson
ATTORNEYS Oct. 29, 1957  H. F. CLAUSEN  2,811,368
VERTICALLY AND LATERALLY ADJUSTABLE WHEEL
MOUNTING MEANS FOR POTATO DIGGERS
Filed Nov. 10, 1955  2 Sheets-Sheet 2
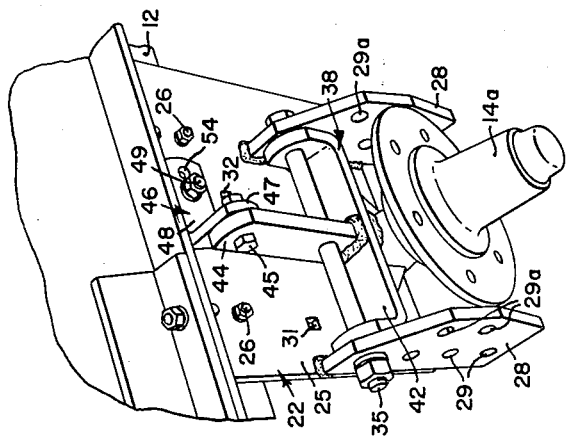
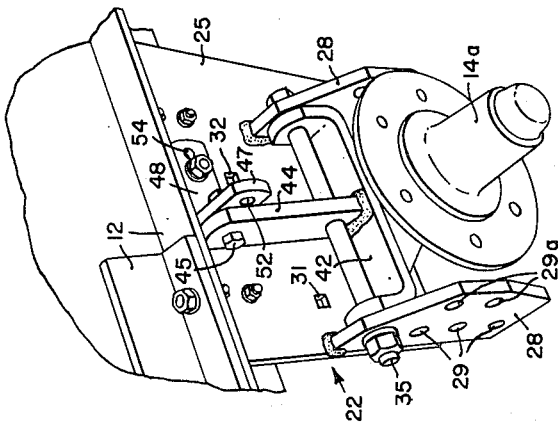
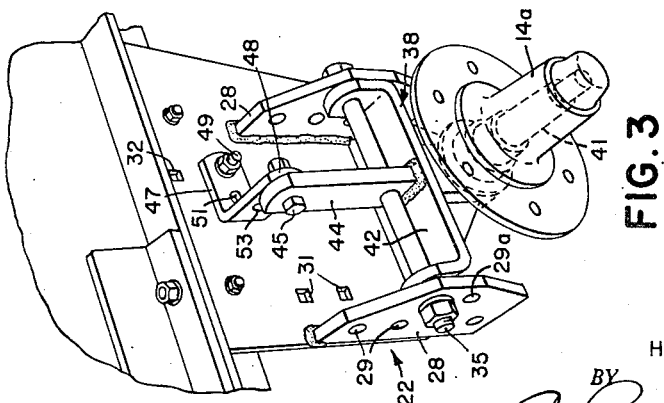
INVENTOR.
HOWARD F. CLAUSEN
BY
ATTORNEYS

United States Patent Office 2,811,368
Patented Oct. 29, 1957

2,811,368

VERTICALLY AND LATERALLY ADJUSTABLE WHEEL MOUNTING MEANS FOR POTATO DIGGERS

Howard F. Clausen, Moline, Ill., assignor to Deere & Company, Moline, Ill., a corporation of Illinois Application November 10, 1955, Serial No. 546,188

10 Claims. (Cl. 280—43)

The present invention relates generally to agricultural implements and more particularly to new and improved wheel mounting means for such implements as potato diggers and the like.

The objects and general nature of the present invention is a provision of a wheel mounting means for agricultural implements and the like in which the supporting wheels for the implement may be adjusted both vertically and laterally relative to the main frame of the implement so as to provide for disposing the frame at the desired level, usually as low as possible in the case of potato diggers, and also to provide the desired or necessary tread spacing, such as to accommodate different row spacings. More specifically, it is a feature of the present invention to provide a wheel carrier and means connected with the latter in different positions both laterally and vertically relative to the main frame of the implement and to secure and retain the desired adjustment by simple, convenient and easily operated means. Particularly, it is a feature of this invention to provide a wheel carrier that can be adjusted vertically relative to the main frame, and also adjustable angularly and, in addition, laterally, thereby providing a plurality of different lateral and vertical positions in which the supporting wheels may be arranged, as required.

These and other objects and advantages of the present invention will be apparent to those skilled in the art after a consideration of the following detailed description of the preferred structure embodiment, in which the principles of the present invention have been incorporated, taken in conjunction with the accompanying drawings in which an embodiment has been illustrated.

In the drawings:

Fig. 1 is a fragmentary perspective of a portion of a potato digger frame in which the principles of the present invention have been incorporated.

Fig. 2 is an enlarged perspective view showing the wheel mounting means in the position disposing the supporting wheel as shown in Fig. 1.

Fig. 3 is a view similar to Fig. 2 showing the wheel mounting means arranged to provide a somewhat increased tread spacing for the wheels, Fig. 3 showing the mounting parts for the widest tread spacing available and with the frame in an intermediate position vertically.

Fig. 4 is a view similar to Figs. 2 and 3, showing the wheel mounting means arranged for the lowest position of the main frame and an intermediate tread spacing.

Fig. 5 is a view similar to Fig. 4, showing the wheel mounting means arranged for a minimum tread spacing, with the frame in the lowest position vertically.

Referring first to Fig. 1, the potato digger in which the principles of the present invention have been shown by way of illustration is indicated in its entirety by the reference numeral 10 and includes a main frame 11 made up of right and left hand frame angles 12 and other longitudinal and transverse frame parts not shown, the frame 11 being supported on a pair of ground wheels 14. As will be best seen in Fig. 1, the wheels 14 are mounted on a wheel frame assembly 20 that comprises a transverse pipe member 21 and a wheel mounting bracket 22 at each end of the pipe member 21. The wheel frame assembly 20 is rigidly connected with and, in effect, forms an integral part of the main frame 11. In the detail views, Fig. 2 et seq., only one of the wheel mounting brackets 22 is shown, since they are substantially identical. Each includes a vertical plate 25 welded or otherwise secured to the adjacent end of the pipe member 21 and also securely fixed, as by bolts 26, to the adjacent portions of the associated frame angle 12. Secured to each side edge portion of the vertical plate 25 is a vertical flange section 28 having a plurality of openings 29 therein. More specifically, it will be noted that each of the vertical flanges 28 is provided with four openings adjacent the plate 26, these openings being arranged in vertically spaced apart relation, and a set of outer openings, also arranged in vertically spaced relation, the outer openings being indicated by the reference numeral 29a. The plate 25 is also provided with a plurality of openings aranged in vertically spaced apart relation, two openings 31 being disposed at one side of the center line of the plate 25 while the other openings 32 are disposed at the other side.

Each of the bracket means 22 provides four optional positions, spaced apart generally vertically, for receiving a through bolt 35 in a lateral position closely adjacent the plane of the associated plate 25. In addition, each bracket 22 provides for two laterally outward positions for the bolt 35, the latter position being defined by the vertically spaced openings 29a. Disposed on each bolt 35 is a wheel carrier bracket 38 that comprises a lower spindle section 41 on which the hub 14a of the associated ground wheel 14 is journaled for rotation, an intermediate mounting section 42 that comprises a strap member turned upwardly at its ends and apertured for reception of the through bolt 35, the strap member 42 being welded or otherwise securely fixed to the laterally inner portion of the associated spindle section 41, and an upwardly extending arm section 44 that also is securely welded or otherwise fixed to the intermediate section 42. The outer end of the arm 44 is apertured to receive a short bolt 45 that connects the arm section 44 in either of two positions to a vertically adjustable angle bracket 46, the laterally outer or shorter leg 47 of which is provided with two apertures that, in Figures 2, 4 and 5, receive the associated bolt 45 in either of two laterally spaced apart positions, the other or longer leg portion 48 also having two openings, either of which, as shown in Figures 2, 4 and 5, may receive a bolt 49 that connects the angle bracket 46 to the plate member 25 at one of the openings 31, 32 provided therein. The two openings in the shorter leg section 47 of the angle bracket 46 are indicated at 51 and 52 and the two openings in the longer leg 48 are indicated at 53 and 54. When the wheel carrier 38 is mounted on the associated bolt 35, the wheel carrier may be angularly adjusted, as shown in Figures 2, 4 and 5, by fixing the upper end of the arm 44 to the bracket leg 47 in either of two positions, as determined by whether the bolt 45 is disposed in the laterally inner opening 51 (Figure 2) or the laterally outer opening 52 (Figure 5) of the bracket 46. It will also be noted that since the bolt 35 may be disposed in any registering pair of vertically spaced openings 29 at the laterally inner portions of the apertured parts 28, the frame may be raised or lowered, as desired, relative to the associated wheels 14 by changing the position of the bolts 35. Whenever the bolt 35 is changed vertically in the apertured bracket 28, it is also necessary to change the angle bracket 46 in the openings 31, 32 so as to correspond to the position of the bolt 35. When either of the openings 31 is to be used, the angle bracket 46 is reversed so that the leg 47 (Fig. 3), or the leg 48 (Figs. 2, 4 and 5), is disposed forwardly. However, to change the angular position of the wheel carrier members 38, it is necessary only to change the position of the bolts 45.

For potato diggers and similar implements, it is usually desirable to have the main frame as low as possible relative to the ground wheels so that the distance through which the potatoes fall to the ground is kept to a desirable minimum. Therefore, for the lowest possible position of the main frame, the bolts 35 are placed in the uppermost openings 29, as shown in Fig. 4, and for an intermediate tread spacing, the wheels 14 are arranged generally vertically, which is done by placing the bolts 45 in the laterally inner openings 51 in the associated angle brackets 46, as shown in Fig. 4. However, if a smaller tread spacing is desired, the bolts 45 are disposed in the laterally outermost opening 52, which serves to tilt the wheels 14 laterally inwardly at their lower portions, the corresponding positions of the wheel carrier brackets 38 being indicated in Fig. 5.

If a wider tread spacing should be desired, wider than that provided by the parts shown in Fig. 2, also Fig. 4, for example, the bolts 35 are removed and the wheel carrier brackets 38 mounted in a laterally outer position relative to the apertured flanges 28 by disposing the bolts 35 in one set of outer openings 29a, as shown in Fig. 3. When the carrier brackets 38 are disposed in this position, it is necessary to rearrange the brackets 46 so as to dispose the longer legs 48 laterally outwardly and place the bolts 45 arranged in the laterally outer openings 54 of the associated angle brackets 46, in which position of the wheel carrier brackets 46 the wheels 14 are disposed vertically.

Thus, I have provided a simple arrangement whereby, in a potato digger or the like, the ground wheels may be adjusted both vertically and laterally relative to the associated main frame. It is also to be noted that the means providing for different wheel spacings, both laterally and vertically, does not entail the use of spare parts or the like, which are apt to become mislaid or otherwise unavailable at the time they are most needed.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In an agricultural implement, support means therefor comprising a supporting bracket, a wheel carrier bracket, means fixing said brackets together in different vertically adjusted positions said wheel carrier bracket being pivotally connected with said supporting bracket, and means fixing said wheel carrier bracket to the supporting bracket in different angular positions.

2. In an agricultural implement including a frame, support means therefor comprising a supporting bracket having a vertically extending apertured section, the apertures being spaced apart both vertically and laterally, a wheel carrier bracket having a part disposable in any one of said apertures for both vertical and lateral adjustment, and means connected with said brackets at points spaced from said apertures to hold said wheel carrier bracket in selected angular position relative to said supporting bracket.

3. In an agricultural implement including a frame, support means therefor comprising a supporting bracket having a vertically extending apertured section, the apertures being spaced apart both vertically and laterally, a wheel carrier bracket having a part disposable in any one of said apertures to determine the vertical position of the wheel carrier bracket relative to the supporting bracket, said wheel carrier bracket being swingable about its connection with the supporting bracket as a center, and means connected with said brackets to hold said wheel carrier bracket in selected angular position relative to said supporting bracket.

4. In an agricultural implement, a supporting bracket, having a pair of vertical flanges provided with vertically spaced apart apertures, a wheel carrier bracket having a laterally outwardly extending axle section and an upwardly extending arm section, pivot means carried by said wheel carrier bracket and disposable in selected flange openings, and means selectively fixing the outer end of said arm section in different lateral positions to said supporting bracket, said last-named means being attachable in different vertical positions to said supporting bracket in steps corresponding to the vertical spacing of said apertures.

5. In an agricultural implement, frame means including a pair of vertical parts spaced apart in a fore-and-aft direction, a rockable wheel carrier having a spindle section and an arm section, a wheel journaled on said spindle section, means pivotally mounting said wheel carrier on said parts for swinging relative thereto to dispose the lower portion of the wheel in different lateral positions relative to said frame means, a laterally extending part connected to said frame means between said spaced apart vertical parts and extending laterally outwardly therefrom, and means connecting the outer end of said arm section with said laterally outwardly extending part in different lateral positions.

6. The invention set forth in claim 5, further characterized by the means pivotally mounting said wheel carrier comprising a pivot member removably associated with said wheel carrier and said parts, the latter having a plurality of vertically spaced apart openings to receive said pivot member in different vertical positions, said frame means having a plurality of vertically spaced openings to receive said laterally extending part so as to dispose the latter also in different vertical positions.

7. In an agricultural implement, frame means including a pair of vertical parts spaced apart in a fore-and-aft direction, a rockable wheel carrier having a spindle section and an arm section, a wheel journaled on said spindle section, the outer end of said arm section being apertured, means pivotally mounting said wheel carrier on said parts and disposed generally between the latter for swinging relative thereto to dispose the lower portion of the wheel in different lateral positions relative to said frame means, a bracket having a pair of laterally spaced apart openings and fixed to said frame means between said parts, and connecting means disposed in the opening in the outer end of said arm section and disposable in either of the laterally spaced apart openings in said bracket.

8. In an agricultural implement, frame means including a pair of vertical parts spaced apart in a fore-and-aft direction, a rockable wheel carrier having a spindle section and an arm section, a wheel journaled on said spindle section, means pivotally mounting said wheel carrier on said parts for swinging relative thereto to dispose the lower portion of the wheel in different lateral positions relative to said frame means, a bracket fixed to said frame means and having a laterally outwardly extending section, and means connecting the outer end of said arm section with the laterally outwardly extending section of said bracket in different lateral positions.

9. In an agricultural implement, frame means including a pair of vertical parts spaced apart in a fore-and-aft direction and each having laterally and vertically spaced apart openings, a rockable wheel carrier having a spindle section and an arm section, a wheel journaled on said spindle section, means adapted to be received in a selected one of said openings in each of said parts for pivotally mounting said wheel carrier on said parts for both lateral adjustment and for swinging relative thereto to dispose the lower portion of the wheel in different lateral positions relative to said frame means, and means connecting the outer end of said arm section with said frame means in different lateral positions.

10. In an agricultural implement, frame means including a pair of vertical parts spaced apart in a fore-and-aft direction, a rockable wheel carrier having a spindle section and an arm section, a wheel journaled on said spindle section, means pivotally mounting said wheel carrier on said parts for swinging relative thereto to dispose the lower portion of the wheel in different lateral positions relative to said frame means, said pivotal mounting means comprising a pivot member removably associated with said wheel carrier and said parts, the latter having a plurality of vertically spaced apart openings to receive said pivot member in different vertical positions, and means connecting the outer end of said arm section with said frame means in different lateral positions including means vertically adjustable relative to said frame means so as to accommodate changes in the vertical position of said pivot member and said wheel carrier.

References Cited in the file of this patent
UNITED STATES PATENTS

| | | |
|---|---|---|
| 1,396,128 | Kopplin | Nov. 8, 1921 |
| 1,633,151 | Winsor | June 21, 1927 |
| 2,709,116 | Heth | May 24, 1955 |